3,148,185
PROCESS FOR THE PREPARATION OF 3-HY-
DROXY-6-KETO-5β,10α-STEROIDS
Albert Bowers and Otto Halpern, Mexico City, Mexico,
assignors to Syntex Corporation, Panama, Panama, a
corporation of Panama
No Drawing. Filed Aug. 14, 1963, Ser. No. 301,998
11 Claims. (Cl. 260—239.55)

The present invention relates to a novel process for the production of cyclopentanophenanthrene derivatives.

More particularly the present invention relates to a novel process for the production of 10α-steroids from the corresponding 19-nor-$\Delta^{5(10)}$-6-keto compounds, especially when applied to derivatives of the androstane, pregnane and spirostane series.

In accordance with the present invention, the surprising discovery has been made that 19-nor-$\Delta^{5(10)}$-6-keto steroids when treated with a methyl magnesium halide in the presence of cuprous chloride, or a similar salt, yield the corresponding 5β,10α-methyl-6-keto steroids which in turn are transformed into the corresponding 10α-methyl-6-desoxo derivatives by conventional procedures, such as the Wolff-Kishner method. The 10α-steroids obtained by the process of the present invention are important compounds per se, and also are useful as intermediates for the production of other 10α-steroids of importance known to those skilled in the art. For instance, 10α-androstane derivatives, such as 5β,10α-androstane-3β,17β-diol-6-one or 17α-methyl-5β,10α-androstane-3β,17β-diol-6-one are good anabolic agents and may further be transformed, respectively, into compounds such as 5β,10α-androstane-3β,17β-diol and 17α-methyl-5β,10α-androstane-3β,17β-diol, or 5β,10α-androstane-3,17-dione, and 17α-methyl-5β,10α-androstan-17β-ol-3-one which in some respects are more active than the parent compounds. The 10α-pregnane derivatives such as 10α-pregnane-3β,20β-diol and 10α-pregnane-3β,20β-diol-6-one, have progestational properties with good oral activity and exhibit anti-estrogenic, anti-androgenic, and antigonadotrophic activities; 10α-spirostanes, such as 5β,10α-22-isopirostan-3β-ol-6-one, are important intermediates in the production of steroids, such as the ones just described.

The novel process of the present invention is illustrated by the following scheme, wherein only the rings A and B of the steroid molecule are represented:

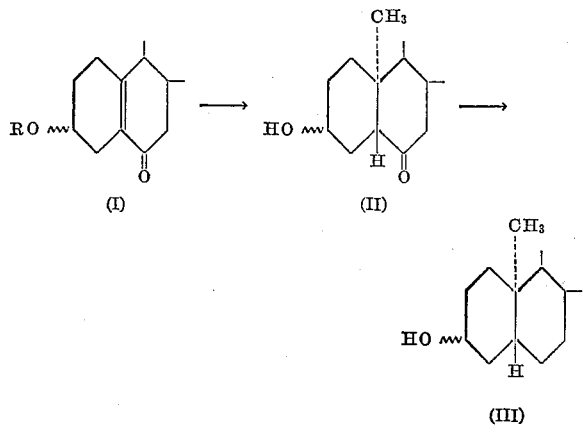

In the above formulae R represents hydrogen or a hydrocarbon carboxylic acyl group of less than 12 carbon atoms.

The starting steroids of the present process (I) are preferably of the androstane, pregnane or spirostane series, and may have a number of substituents present in the molecule without interfering with the reaction. For example, at C–17 there may be present a 17β-hydroxy or acyloxy group with or without a lower hydrocarbon residue at C–17α, a 17β-acetyl group, preferably protected by a 20-ketal, with or without a 17α-hydroxy or acyloxy group, or a dihydroxy acetone side chain, preferably protected by a 17,20;20,21-bismethylenedioxy grouping; at C–16 there may be present a hydroxyl group, a methyl group, a halogen atom, and the like. Groups similar to the above may also be present in other parts of the molecule, as for example, C–2, C–4, C–7, C–9, C–11, C–12, C–15, C–18 and so forth.

In accordance with the present invention a 3-(hydroxy or acyloxy)-$\Delta^{5(10)}$-6-keto steroid (I) of the type described hereinbefore is treated with a methyl magnesium halide, such as the chloride or bromide, in the presence of cuprous chloride or of a metal salt having an oxidation reduction potential similar or equal thereto, such as other cuprous halides, e.g. cuprous bromide, and the like, in an organic solvent free from active hydrogen, preferably comprising an ether function such as tetrahydrofurane, ethyl ether and the like, at a temperature that may range from approximately 20° C. to 40° C., during a period of time of about 0.5 to 4 hours, preferably 1 to 2 hours, thus yielding the corresponding 3-hydroxy-5β,10α-steroid-6-one (II).

The amount of cuprous chloride, or similar salt, to be used is not critical and may range from around 0.1 to 100 times the weight of starting steroid, but the preferred range is from about 0.5 to 2 times the weight of steroid.

The amount of methyl magnesium halide is similarly not critical and a deficiency in reagent would only cause low yields in final compound, without having any influence in the nature of the latter. Excesses of reagent are prefererd for a complete transformation, but the minimum amount required for high yields is of approximately two molar equivalents for a 3-(hydroxy or acyloxy)-$\Delta^{5(10)}$-6-keto moiety, with the addition of one molar equivalent for each grouping in the molecule which is known to those skilled in the art to be liable of reacting with this reagent, such as carbonyl groups, groups comprising active hydrogens, and the like.

The 3-hydroxy-5β,10α-steroidal-6-ketones (II) are further transformed into the corresponding 3-hydroxy-6-desoxo-5β,10α-steroids (III) by conventional procedures, such as the Wolff-Kishner method, i.e. treatment with hydrazine hydrate in the presence of an alkali metal hydroxide, followed by thermal decomposition, or such as treatment with ethanedithiol in the presence of hydrochloric acid, followed by desulfurization with Raney nickel.

The latter steroids (III) may be transformed into the corresponding 3-ketones, $\Delta^4$-3-ketones, 6-substituted-$\Delta^4$-3-ketones by conventional procedures.

The following specific examples serve to illustrate, but are not intended to limit the scope of the present invention.

PREPARATION 1

The starting compounds of the present preparation were obtained according to our copending U.S. patent application Serial No. 236,724, filed November 9, 1962, by oxidation of the corresponding $\Delta^5$-10β-hydroxy methyl compounds with chromium trioxide in pyridine.

A solution of 1 g. of sodium borohydride in 3 cc. of water was added to an ice-cooled solution of 1 g. of the acetate of $\Delta^{5(10)}$-19-nor-pregnen-3β-ol-6,20-dione in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give $\Delta^{5(10)}$-19-nor-pregnene-3β,6β,20β-triol.

A mixture of 0.9 g. of the latter compound in 20 cc. of dioxane and 1.1 molar equivalents of 2,3-dichloro-5,6-dicyano-1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone-hexane gave $\Delta^{5(10)}$-19-nor-pregnene-3β,20β-diol-6-one.

The above procedures were applied to the starting compounds listed hereinafter under A, thus giving the products set forth under B:

| A | B |
|---|---|
| Acetate of 16α-methyl-$\Delta^{5(10)}$-19-nor-pregnen-3β-ol-6,20-dione. | 16α-methyl-$\Delta^{5(10)}$-19-nor-pregnene-3β,20β-diol-6-one. |
| Acetate of 16β-methyl-$\Delta^{5(10)}$-19-nor-pregnene-3β-ol-6,20-dione. | 16β-methyl-$\Delta^{5(10)}$-19-nor-pregnene-3β,20β-diol-6-one. |
| Acetate of 16α,17α-iso-propylidenedioxy-$\Delta^{5(10)}$-19-nor-pregnen-3β-ol-6,20-dione. | 16α,17α-isopropylidenedioxy-$\Delta^{5(10)}$-19-nor-pregnene-3β,20β-diol-6-one. |
| Diacetate of $\Delta^{5(10)}$-19-nor-pregnene-3β,17α-diol-6,20-dione. | $\Delta^{5(10)}$-19-nor-pregnene-3β,17α,20β-triol-6-one. |
| Diacetate of 16α-methyl-$\Delta^{5(10)}$-19-nor-pregnene-3β,17α-diol-6,20-dione. | 16α-methyl-$\Delta^{5(10)}$-19-nor-pregnene-3β,17α,20β-triol-6-one. |
| Acetate of 17,20;20,21-bis-methylenedioxy-$\Delta^{5(10)}$-19-nor-pregnen-3β-ol-6,11-dione. | 17,20;20,21-bismethylenedioxy-$\Delta^{5(10)}$-19-nor-pregnene-3β,11β-diol-6-one. |

Example I

To a mixture of 1 g. of the diacetate of $\Delta^{5(10)}$-19-nor-androstene-3β,17β-diol-6-one (obtained according to our copending U.S. pat. appl. Ser. No. 236,724, filed Nov. 9, 1962) 1 g. of cuprous chloride and 30 cc. of anhydrous tetrahydrofuran was added, while stirring and cooling, 30 cc. of tetrahydrofuran, containing 3 mol. equiv. of methyl magnesium bromide.

The mixture was stirred for 2 hours at 28° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 5β,10α-androstane-3β,17β-diol-6-one.

Example II

A mixture of 1 g. of the latter compound, 2 g. of hydrazine hydrate, 1.2 g. of potassium hydroxide, 1.2 cc. of water and 1.2 cc. of diethylene glycol was heated under reflux for 45 minutes. It was then heated in an open flask until the temperature of the reaction mixture reached 200° C. a reflux condenser was attached, and refluxing was continued for a further 2 hours. The solution was cooled, water added and the product isolated by extraction with ether. Recrystallization of the residue obtained after evaporation of the solvent from acetone-hexane afforded 5β,10α-androstane-3β,17β-diol.

Example III

The starting compounds listed hereinafter under A, which were obtained in accordance either with Preparation 1 or with our copending U.S. pat. appl. Ser. No. 236,724, filed Nov. 9, 1962, (by oxidation of the corresponding $\Delta^5$-10β-hydroxymethyl derivatives with chromium trioxide), were treated according to Example I, thus yielding respectively the corresponding products set forth under B:

| A | B |
|---|---|
| $\Delta^{5(10)}$-19-nor-pregnene-3β,20β-diol-6-one. | 10α-pregnane-3β,20β-diol-6-one. |
| 16α-methyl-$\Delta^{5(10)}$-19-nor-pregnene-3β,20β-diol-6-one. | 16α-methyl-10α-pregnane-3β,20β-diol-6-one. |
| 16β-methyl-$\Delta^{5(10)}$19-nor-pregnene-3β,20β-diol-6-one. | 16β-methyl-10α-pregnane-3β,20β-diol-6-one. |
| 16α,17α-isopropylidene-dioxy-$\Delta^{5(10)}$-19-nor-pregnene-3β,20β-diol-6-one. | 16α,17α-isopropylidenedioxy-10α-pregnane-3β,20β-diol-6-one. |
| $\Delta^{5(10)}$-19-nor-pregnene-3β,17α,20β-triol-6-one. | 10α-pregnane-3β,17α,20β-triol-6-one. |
| 16α-methyl-$\Delta^{5(10)}$-19-nor-pregnene-3β,17α,20β-triol-6-one. | 16α-methyl-10α-pregnane-3β,17α,20β-triol-6-one. |
| 17,20;20,21-bismethylene-dioxy-$\Delta^{5(10)}$-19-nor-pregnene-3β,11β-diol-6-one. | 17,20;20,21-bismethylene-dioxy-10α-pregnane-3β,11β-diol-6-one. |
| Acetate of 17,20;20,21-bis-methylenedioxy-$\Delta^{5(10)}$-19-nor-pregnen-3β-ol-6-one. | 17,20;20,21-bismethylene-dioxy-10α-pregnan-3β-ol-6-one. |
| 3-monoacetate of 17α-methyl-$\Delta^{5(10)}$-19-nor-androstene-3β,17β-diol-6-one. | 17α-methyl-5β,10α-androstane-3β,17β-diol-6-one. |
| 3-monoacetate of 17α-vinyl-$\Delta^{5(10)}$-19-nor-androstene-3β,17β-diol-6-one. | 17α-vinyl-5β,10α-androstane-3β,17β-diol-6-one. |
| 3-monoacetate of 17α-ethinyl-$\Delta^{5(10)}$-19-nor-androstane-3β,17β-diol-6-one. | 17α-ethinyl-5β,10α-androstane-3β,17β-diol-6-one. |
| Acetate of $\Delta^{5(10)}$-19-nor-22-isospirosten-3β-ol-6-one. | 5β,10α-22-isospirostan-3β-ol-6-one. |

Example IV

The final compounds of Example III were treated according to Example II, thus giving the corresponding 6-desoxo-compounds.

Example V

The procedure described in Example I was repeated except that there was used 0.5 g. of cuprous chloride and the solvent was ether, thus yielding the same results.

Example VI

To a mixture of 1 g. of the diacetate of $\Delta^{5(10)}$-19-nor-androstene-3β,17β-diol-6-one, 2 g. of cuprous chloride and 30 cc. of anhydrous tetrahydrofuran was added, while stirring and cooling, 30 cc. of tetrahydrofuran, containing 5 mol. equiv. of methyl magnesium bromide.

The mixture was stirred for 1 hour at 35° C., then poured into ice-water, containing dilute hydrochloric acid. The product was extracted with methylene chloride, the extract washed to neutral with water and dried over anhydrous sodium sulfate. Evaporation of the solvent at reduced pressure gave a residue, which was purified by crystallization from methylene chloride-hexane to afford 5β,10α-androstane-3β,17β-diol-6-one.

Example VII

The procedure described in Example I was repeated, except that there were used methyl magnesium chloride instead of the bromide and cuprous bromide in lieu of the chloride and the reaction temperature was of 40° C., thus yielding the same results.

We claim:
1. A process for the production of 3-hydroxy-6-keto-5β,10α-steroids which comprises treating a $\Delta^{5(10)}$-6-keto steroid selected from the group consisting of 3-hydroxy and 3-(hydrocarbon carboxylic acyloxy of less than 12 carbon atoms) androstanes, pregnanes and spirostanes with a methyl magnesium halide in the presence of a cuprous halide, in an organic solvent free from active hydrogens.

2. The process of claim 1 wherein the reaction is carried out at approximately 20° C. to 40° C. during about 0.5 to 4 hours.

3. The process of claim 1 wherein the methyl magnesium halide is the bromide.

4. The process of claim 1 wherein the methyl magnesium halide is the chloride.

5. The process of claim 1 wherein the cuprous halide is cuprous chloride.

6. The process of claim 1 wherein the cuprous halide is cuprous bromide.

7. The process of claim 1 wherein the organic solvent comprises an ether function.

8. The process of claim 1 wherein the organic solvent is tetrahydrofuran.

9. The process of claim 1 wherein the organic solvent is ether.

10. The process of claim 1 wherein the weight of cuprous halide is about 0.1 to 100 times the weight of the starting steroid.

11. The process of claim 1 wherein the amount of methyl magnesium halide is more than 2 molar equivalents.

No references cited.